(12) United States Patent
Kellermann et al.

(10) Patent No.: US 7,747,001 B2
(45) Date of Patent: Jun. 29, 2010

(54) SPEECH SIGNAL PROCESSING WITH COMBINED NOISE REDUCTION AND ECHO COMPENSATION

(75) Inventors: Walter Kellermann, Eckental (DE); Wolfgang Herbordt, Volkach (DE)

(73) Assignee: Nuance Communications, Inc., Burlington, MA (US)

( * ) Notice: Subject to any disclaimer, the term of this patent is extended or adjusted under 35 U.S.C. 154(b) by 960 days.

(21) Appl. No.: 11/218,687

(22) Filed: Sep. 2, 2005

(65) Prior Publication Data

US 2006/0153360 A1 Jul. 13, 2006

(30) Foreign Application Priority Data

Sep. 3, 2004 (EP) .................................. 04021055

(51) Int. Cl.
*H04M 9/08* (2006.01)
(52) U.S. Cl. ................................. 379/406.01
(58) Field of Classification Search ................ 381/92, 381/94, 71; 379/410, 406.01; 455/296
See application file for complete search history.

(56) References Cited

U.S. PATENT DOCUMENTS 7,035,415 B2 * 4/2006 Belt et al. ...................... 381/92

FOREIGN PATENT DOCUMENTS

| EP | 0204718 B1 | 3/1992 |
| EP | 1020068 B1 | 9/1998 |
| GB | 2 355 632 A | 4/2001 |
| WO | WO 96/26592 | 8/1996 |
| WO | WO 01/93554 A | 12/2001 |

OTHER PUBLICATIONS

Kristine L. Bell, Linearly Constrained Minimum Variance Beamforming with Quadratic pattern constraints for spatially spread Sources, Nov. 9-12, 2003, IEEE, Signals, Systems and Computers, Conference Record of the Thirty-Seventh Asilomar Conference, vol. 1, pp. 942-946.*
Rajiv Chandrasekaran, A constrained least-squares algorithm with data-adaptive beamforming and equalization for cochannel TDMA signals, Oct. 2000, Signal Processing, vol. 80, Issue 10, pp. 2033-2047.*
Herbordt et al., "Computationally Efficient Frequency-Domain Combination of Acoustic Echo Cancellation and Robust Adaptive Beamforming," Eurospeech 2001—Scandanavia, vol. 2, 2001, p. 1001.
Hoshuyama et al., "A Robust Adaptive Beamformer for Microphone Arrays With a Blocking Matrix Using Constrained Adaptive Filters," IEEE Transactions on Signal Processing, vol. 47, No. 10, Oct. 1999, pp. 2677-2684.

(Continued)

*Primary Examiner*—Alexander Jamal
(74) *Attorney, Agent, or Firm*—Sunatein Kann Murphy & Timbers LLP

(57) ABSTRACT

A speech signal processing system combines acoustic noise reduction and echo cancellation to enhance acoustic performance. The speech signal processing system may be used in vehicles or other environments where noise-suppressed communication is desirable. The system includes an adaptive beamforming signal processing unit, an adaptive echo compensating unit to reduce acoustic echoes, and an adaptation unit to combine noise reduction and adaptive echo compensating.

28 Claims, 3 Drawing Sheets

OTHER PUBLICATIONS

Kellerman et al., "Strategies for Combining Acoustic Echo Cancellation and Adaptive Beamforming Microphone Arrays," Acoustics, Speech, and Signal Processing, 1997 IEEE International Conference on Munich, Germany, vol. 1, Apr. 21, 1997, pp. 219-222.

Van Trees, H.L., "Optimum Array Processing, Part IV of Detection, Estimation and Modulation Theory", Publisher John Wiley & Sons, New York 2002, pp. 710-916.

Brandstein, M. et al., "Microphone Arrays: Signal Processing Techniques and Applications", Chapter 13, Publisher Springer-Verlag, Berlin 2001, pp. 281-306.

Buckley, K., "Broad-Band Beamforming and the Generalized Sidelobe Canceller", IEEE Transactions on Acoustics, Speech, and Signal Processing, vol. 34, No. 5, Oct. 1986, pp. 1322-1323.

* cited by examiner

SPEECH SIGNAL PROCESSING WITH COMBINED NOISE REDUCTION AND ECHO COMPENSATION

PRIORITY CLAIM

This application claims the benefit of priority from European Patent Application EP 04 02 1055.1, filed Sep. 3, 2004, which this application incorporates herein by reference.

BACKGROUND OF THE INVENTION

1. Technical Field

This invention relates to speech signal processing. In particular, the invention relates to multi-channel speech signal processing system.

2. Related Art

Speech signal processing may be performed in a noisy background, such as in a vehicle. In hands-free telephones or other communications devices, noise suppression may be needed to ensure reliable communication. The amplitudes and frequencies of the noise may vary temporally.

The suppression of signals transmitted by loudspeakers and received by the microphone(s), may be desired because echoes may affect the quality and intelligibility of voice conversation. Unfortunately, different convergence properties of adaptive beamformers and echo canceling may require excessive hardware and computational requirements. Therefore, there is a need to improve acoustic properties in speech signal processing with enhanced (SNR) and echo compensation.

SUMMARY

A speech signal processing system combines acoustic noise reduction and echo cancellation to enhance acoustic performance. The speech signal processing system may be used in vehicles or other environments where noise-suppressed communication is desirable. The system includes an adaptive beamforming signal processing unit, an adaptive echo compensating unit to reduce acoustic echoes, and an adaptation unit to combine noise reduction and adaptive echo compensating.

A method reduces noise and echoes and includes receiving speech signals, noise, and acoustic echoes, and performing noise reduction and echo compensation. The method may adapt the received signals to properties of a desired signal.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
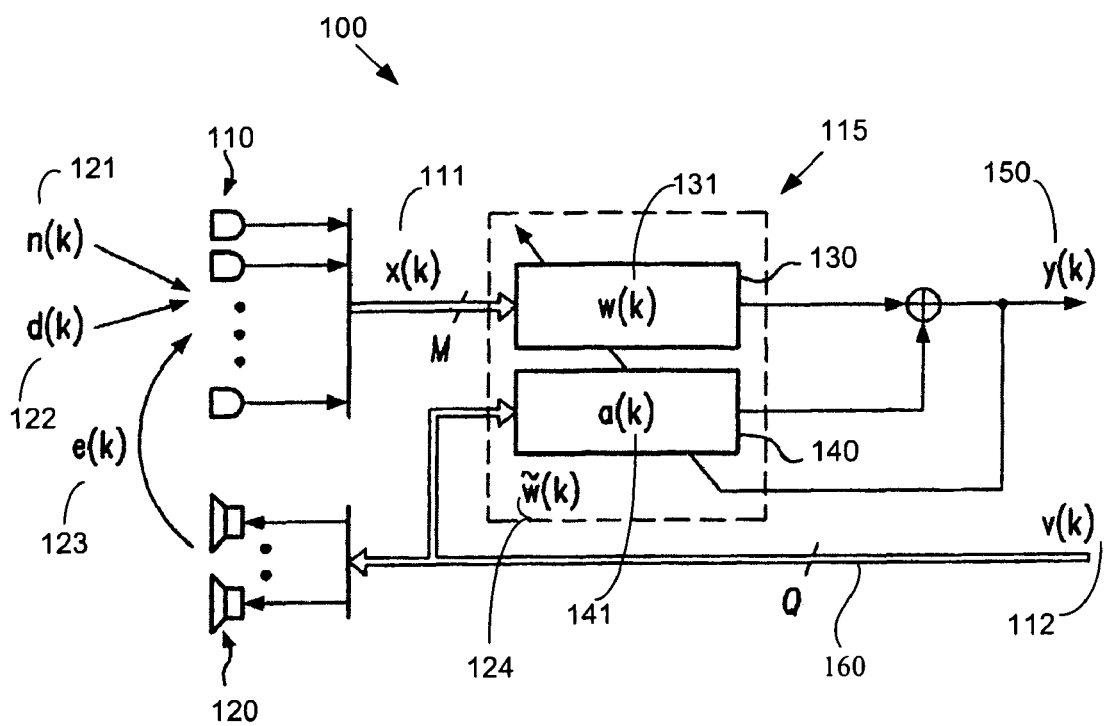
FIG. 1 illustrates a signal processing system.

FIG. 1 illustrates a speech signal processing system 100. The speech signal processing system may include an array of devices that convert sound into analog signals and/or digital data or an array of microphones 110, an array of devices that convert signals into sound or an array of loudspeakers 120, and a device that improves a signal to noise ratio (SNR) or an adaptive beamformer 115. The system 100 may include two or more microphones 110 and at least one loudspeaker 120. The speech signal processing system 100 may provide an enhanced SNR and, ideally, a substantially complete echo canceling. Speech signals may include any signals representing information of verbal utterances. The speech signals may be available as functions of discrete time indices or as Fourier transformed signals in the frequency domain. The microphones 110 may detect speech signals as well as noise and acoustic echoes. Consequently, the adaptive beamforming unit 115 may not only receive speech signals but also noise and echo signals.

The microphone signals detected by the number M microphones 110 may be available as a signal vector x(k) (k is the discrete time index) and may be superimposed signals $$x(k)=d(k)+n(k)+e(k),$$

where d(k) 122, n(k) 121 and e(k) 123 may denote the desired signal, the local noise signal and the acoustic echo signal, respectively. The echoes may be caused by the output signals of at least one speaker or loudspeaker 120 and may show the reverberating characteristics of the room.

The signals x(k) 111 may be processed by an adaptive beamformer 130. The beamformer 130 may combine the input signals of the different M microphone channels 110 into one beamformed output signal y(k) 150 that may have an enhanced signal-to-noise ratio (SNR). The beamformer 130 may use one or more beamformer adaptive filters w(k) 131. The adaptive echo cancellation (AEC) unit 140 may model the echo paths, e.g., as linear responses. Through the AEC adaptive filters a(k) 141, the echo portions of the processed microphone signals may be subtracted. The beamformer 130 and the echo compensating unit 140 may be adaptive units. The beamformer 130 and echo compensating unit 140 may employ filters including temporally varying filter vectors that may be continuously recalculated during the speech communication process to optimize the speech signal processing with respect to noise reduction and echo compensation. The echo compensating unit may be a single or multiple channel unit.

A beamformer 130 may combine different input signals 111 received concurrently or substantially at the same time into one beamformed signal. The noise levels of the signal portions in each received channel may differ from each other. Averaging the different channels with very low SNR may deteriorate the SNR of the output signal. Thus, it may be desirable to introduce weighting coefficients (weights) for the different channels, preferably calculated time-dependently in response to changing speech detecting condition, such as time-dependent noises and/or speaker movement.

The output signal of the combined system may be written as a function of the sensor signals x(k) 111, the loudspeaker signals v(k) 112 as well as the adaptive filters w(k) 131 and a(k) 141:

$$y(k)=\tilde{w}^T(k)\tilde{x}(k).$$

with $$\tilde{w}(k) = (w^T(k), a^T(k))^T,$$

$$\tilde{x}(k) = (x^T(k), v^T(k))^T$$

where the upper index T may denote the vector transposition operation. The speaker signals v(k) 112 of Q speaker channels 160 may be the reference signals for the acoustic echoes. That is, they may serve as input signals for the adaptive echo compensating means 140. The signals v(k) 112 may be received through sensor channels or paths of the beamformer 115, thereby increasing the degrees of freedom usable for the adaptive beamforming.

The adaptive beamformer 130 (the adaptive filters w(k) 131 with $N_w$ filter coefficients), and the AEC unit 140 (the adaptive filters a(k) 141 with $N_a$ filter coefficients) may be optimized in combination and substantially simultaneously by an adaptation unit 115, so that the beamformer gain may be maintained and the acoustic echoes may be suppressed. For the optimization procedure, a Least Squares (LS) optimization criterion may be applied. The system 100 may solve:

$$\min_{\tilde{w}(k)} \sum_{i=0}^{k} w_i(k) y^2(i) = \text{ subject to } \underline{\tilde{C}}^T(k)\tilde{w}(k) = c(k)$$

with $$\underline{\tilde{C}}(k) = (\underline{C}^T(k), 0_{C \times QN_a})^T,$$

where $\underline{C}(k)$ is a constraint matrix of size $M N_w \times C$, and c(k) is the constraint column vector of length C that represents C constraints to assure unity of the beamformed output signal. $\underline{C}(k)$ may be configured to be a Linear Constrained Minimum Variance matrix used in beamforming. The $C \times QN_a$ null values in the constraint matrix result from the assumption that the loudspeaker signals v(k) 112 may be uncorrelated. The windowing function $w_i$ may extract the desired samples from the output signals, which should be included into the optimization procedure. According to the optimization criterion above, for an arbitrary number of microphones, only one error signal has to be minimized. The substantially simultaneous and combined adaptation of the adaptive beamforming unit 115 and the adaptive echo canceling unit 140 may create desirable synergetic effects, such as the absence of some or nearly all tracking effects caused by separate optimization. Also, only one adaptive echo cancellation unit 140 may be needed.

The combined adaptation may be realized by the adaptation of an effective weight vector representing the combined weights of the adaptive filters of both the beamformer 130 and the AEC unit 140. Moreover, the number of degrees of freedom for both the noise reduction and the echo canceling may be increased by increasing the number of loudspeaker, thereby improving the optimization of the adaptive filters employed by the beamformer 130 and AEC unit 140.

Figure 2:
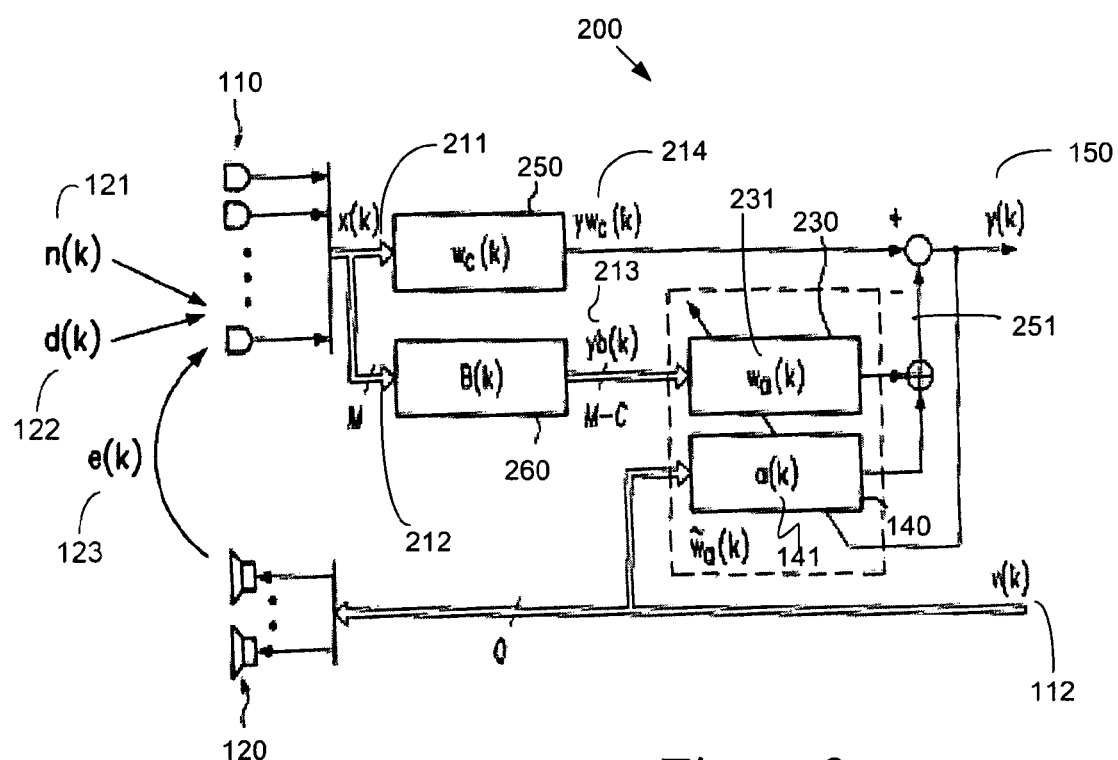
FIG. 2 illustrates a second signal processing system.

FIG. 2 illustrates a speech signal processing system 200 including a General Sidelobe Canceller (GSC) 230 and an AEC unit 140 optimized. The GSC 230 may be an implementation of an adaptive beamformer and may comprise two signal processing paths: one noise reduction and one reference signal processing path. The reference (or upper) signal processing path 211 includes a fixed beamformer 250 which may be directed to one or more sources of a desired signal d(k) 122 detected by the microphones 110. The beamformed signal may be characterized by an enhanced SNR.

The noise reduction (or lower) signal processing path 212 includes a non-adaptive or an adaptive blocking matrix 260 that may generate noise reference signals $y_{B(k)}$ 213. The signals $y_{B(k)}$ 213 include little desired speech. The blocking matrix 260 may perform a subtraction of adjacent channels. The noise reference signals $y_{B(k)}$ 213 may be used as input signals for an adaptive noise canceling means 230. The adaptive noise cancellation is done by (complex-valued) filters $w_{a(k)}$ 231. These filters may be adapted with the goal that the power of the output signal is minimized. The output signal 251 of the adaptive noise canceling unit 140 may then be subtracted from the beamformed signal 214. Since the reference signals 112 ideally may contain no signal portions, the residual noise of the signal may be almost completely reduced by the adaptive noise canceling unit 140 and therefore the SNR of the final output signal y(k) 150 may be increased. The incorporation of a GSC structure 230 significantly reduces the processor load. The simultaneous and combined adaptation of the GSC 230 and AEC unit 140 components inhibits leakage of acoustic echoes through the blocking matrix 260 and the adaptive noise canceling unit, even when acoustic echoes are efficiently suppressed. In addition, the system 100 or 200 system may function reliably even when strong local noise signals are detected by the microphone array 110 and/or the echo paths are changing continuously.

The adaptive noise canceling unit and the AEC unit 140 may include adaptive filters, and preferably the filter length of the adaptive filter of the AEC unit 140 is equal to or longer than the filter length of the adaptive filter of the adaptive noise canceling means. By "filter length," commonly the number of filter coefficients is meant. The AEC unit 140 may require a higher number of filter coefficients to work sufficiently reliably, which may result in a lower convergence speed for the optimization as compared to the adaptive beamforming unit. In noisy environments with relatively low reverberations, however, (e.g. in vehicles) the choice of a comparable or equal number of filter coefficients for the AEC unit 140 and the beamformer 130 may be tolerable.

In conventional settings for adaptation of the filters for noise reduction, the Normalized Least-Mean Squares (NLMS) algorithm may be used:

$$y_{GSC}(k) = y_{wc}(k) - \sum_{m=1}^{M-1} y_B(k) w_a(k)$$

$$w_a(k+1) = w_a(k) + \frac{\beta(k)}{\sum_{l=1}^{M-1} |y_B(k)|^2} y_{GSC}(k) y_B^*(k).$$

where $y_{GSC}$ denotes the output signal of the GSC 230 alone, i.e., if no AEC unit 140 was present, β is some positive real-valued number, and the asterisk denotes the complex conjugate of the noise reference signals. The NMLS may be performed by minimizing a windowed sum of squared output signal samples subject to constraints that assure at least uniqueness of the output signal. The windowing function employed in the summation selects samples of output signals to be considered for the optimization procedure.

The noise reference signals 121 and the adaptive filters $w_a(k)$ 231 may be used to generate an adaptive noise signal to be subtracted from the beamformed signal $y_{w_c}$ output by the beamformer 250. The adaptive filters of both the GSC 230 and the AEC unit 140 may be adapted almost simultaneously by optimizing for $\tilde{w}(k)$ 124. The weight vector $\tilde{w}(k)$ 124 may be projected onto two orthogonal subspaces, one of which ($\tilde{w}_c(k)$) may be chosen to fulfill the C constraints (in constraint subspace):

$$P_c(k)\tilde{w}(k) =: \tilde{w}_c(k) = (w_c^T(k), 0_{1 \times QN_a})^T$$

The second subspace may be chosen as:

$$P_a(k)\tilde{w}(k) := -\tilde{B}(k)\tilde{w}_a(k),$$

with $$\underline{\tilde{C}}^T(k)\tilde{B}(k) \stackrel{!}{=} 0.$$

and $$\tilde{B}(k) = \begin{pmatrix} B(k) & 0_{MN_w \times QN_a} \\ 0_{QN_a \times (M-C)N_w} & I_{QN_a \times QN_a} \end{pmatrix}$$

where $I_{QN_a \times QN_a}$ is the identity matrix of size $QN_a \times QN_a$, and the columns of the matrix B(k) are orthogonal to the columns of the constraint matrix $\underline{C}(k)$. The least squares minimization of the final output signal y(k) 150 now reads:

$$\min_{\tilde{w}_a(k)} \sum_{i=0}^{k} w_i(k) \left[ (\tilde{w}_c(k) - \tilde{B}(k)\tilde{w}_a(k))^T \tilde{x}(i) \right]^2$$

with $\tilde{w}_c(k)$ being the projection of the weight vector $\tilde{w}(k)$ 124 onto the second of the orthogonal subspaces fulfilling the constraint of the optimization problem. Solution of the minimization problem provides the optimal weight vector $\tilde{w}_{a,opt}(k)$ $$\tilde{w}_{a,opt}(k) = \left( \tilde{B}^T(k)\tilde{\Phi}(k)\tilde{B}(k) \right)^+ \tilde{B}^T(k)\tilde{\Phi}(k)\tilde{w}_c(k),$$

with $$\tilde{\Phi}(k) = \sum_{i=0}^{k} w_i(k)\tilde{x}(i)\tilde{x}^T(i).$$

$\tilde{\Phi}(k)$ denotes the sample correlation matrix of the data vector $\tilde{x}(k)$ and the upper index "+" denotes the pseudoinverse of the matrix. Formally, the solution for the optimum weight vector is equivalent to the optimum weight vector for the GSC 230.

Figure 3:
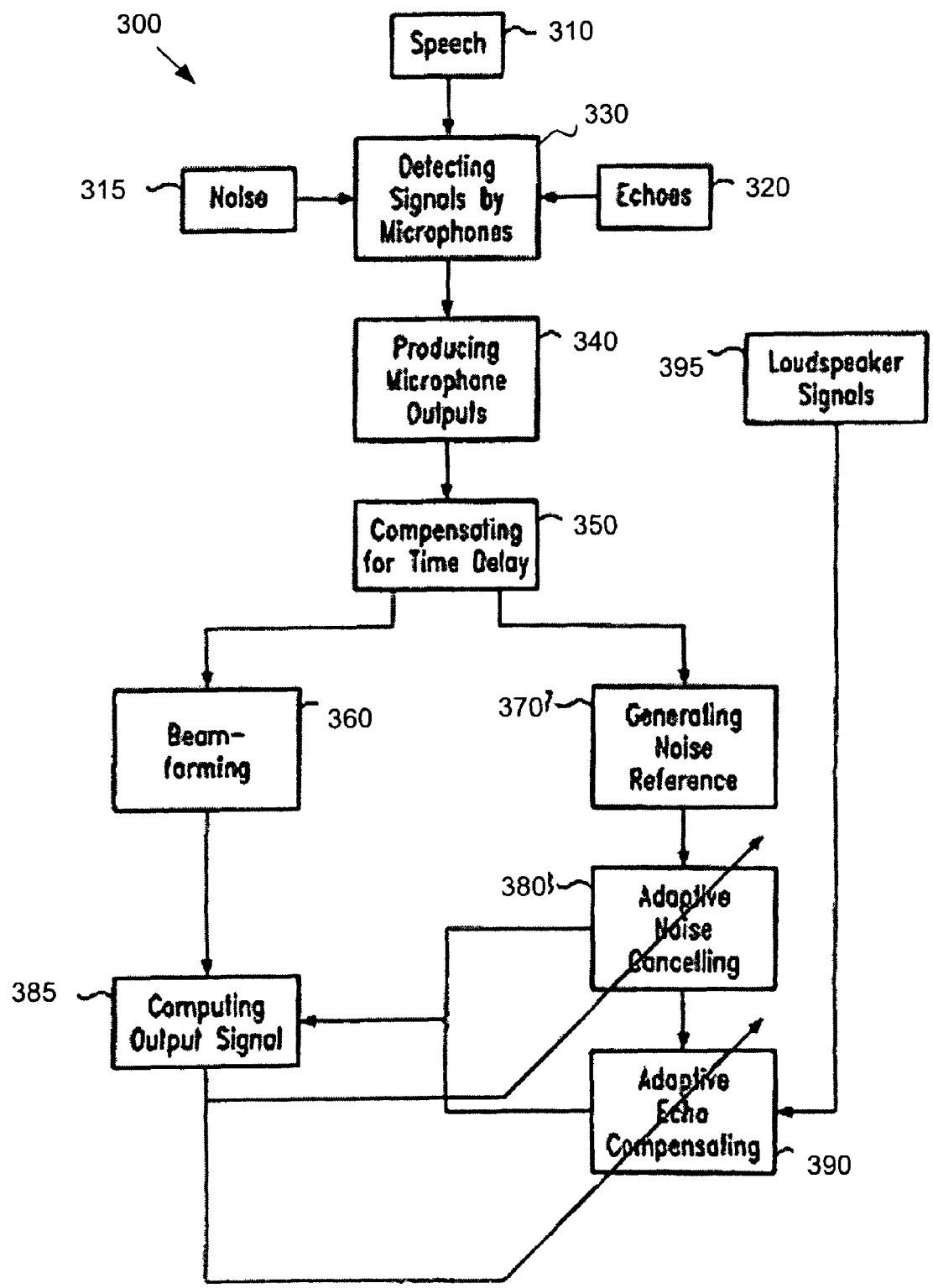
FIG. 3 illustrates a process that reduces noise and compensates for echoes.

FIG. 3 illustrates acts to implement a speech signal processing system 300. At blocks 310, 315, and 320, speech signals d(k) 122, noise signals n(k) 121, and echo signals e(k) 123 respectively may be provided to the speech signal processing system (100 or 200). An array of microphones including at least two microphones may detect signals (act 330) including first speech signals d(k) 122, noise signals n(k) 121, and echo signals e(k) 123 respectively. At block 340, the system (100 or 200) may produce microphone outputs x(k) 111.

At block 350, the output microphone signals 111 may be synchronized corresponding to a desired target signal v(k) 112, in which the time delay of each signal may be computed and compensated. The synchronized signals may serve as input signals for both signal processing paths (211 and 212) of the employed GSC 230. A delay-and-sum beamformer 250 of the upper signal processing path 211 may combine the signals to obtain an output signal 214 with enhanced SNR at block 360. A blocking matrix 260 may generate noise reference signals 213 by subtracting adjacent channels at block 370. Alternatively, a Walsh-Hadamard kind of blocking matrix or a Griffiths-Jim blocking matrix may be employed.

The noise reference signals 121 may be used as input signals for adaptive noise canceling (act 380). Besides noise reduction, the speech signal system (100 or 200) may provide echo compensation. An AEC unit 140 may use the speaker signals v(k) 112 (e.g., a loudspeaker), including second speech signals may be output by at least one speaker in the loudspeaker array 120, (act 395) to compensate for the acoustical echoes e(k) 123 (act 390). Speaker signals including second speech signals may be output by at least one speaker in the speaker array 120. The first speech signals above may be obtained on the basis of the microphone signals, and the speaker signals may be used as the input signals for the adaptive compensating of acoustic echoes.

The adaptation of the filters of both the GSC 230 and the AEC unit 140 may be performed substantially simultaneously. The beamformed signal 214 obtained by the beamforming at block 360 may be further processed by the adaptive noise canceling step from block 380 and the adaptive echo compensating step 390 to provide an output signal 150 of high purity (act 385). The time delay compensation of the microphone output signals at block 350 may be supplemented by adaptively self-calibrating the time delayed signals to match the phases and amplitudes of the microphone signals or the time delay compensated microphone signals to obtain the first speech signals. The calibrated signals may then be phase-aligned with respect to the desired signal and the amplitudes of the desired signal portions may be equal in each of the multiple channels.

The adaptive beamforming as well as the adaptive echo compensating may be performed using adaptive filters. The associated weight vectors may be combined to form one combined filter vector. The adaptation of this combined filter vector may result in a substantially simultaneous adaptation of the filters of the combined adaptive beamforming unit and the adaptive echo compensating unit. Adaptive filters may be used for the adaptive echo compensation and the adaptive noise canceling. The filter length of the filter of the adaptive echo compensation may be substantially equal to or longer than the filter length of the filter of the adaptive noise cancellation.

The combined adaptive filters may be adapted by applying a Least Squares optimization criterion with a constraint according to:

$$\underline{C}^T(k), 0_{C \times QN_a})^T (w^T(k), a^T(k))^T = c(k)$$

where the upper index T denotes the vector transposition, $\underline{C}$ is a constraint matrix, w(k) and a(k) are the filters of the adaptive beamforming and the adaptive noise canceling, respectively, Q is the number of the at least one loudspeaker, $N_a$ is the number of filter coefficients of the filters of the adaptive echo canceling unit and c is the constraint vector representing C constraints.

The complex self-calibration filters that perform a matching of the time delayed signals in each channel may be adapted by the NLMS algorithm so that the error signals may be minimized. After time delay compensation, the microphone signals may not be matched accurately due to, for example, speaker movement and phase and amplitude mismatch of the different microphones. By the adaptive self-calibration, the mismatches with respect to phases and amplitudes may be minimized. Accordingly, the desired signals in each of the channels are time and/or phase-aligned. The amplitudes of the desired signal portions may be almost equal in each of the channels and the signals may be expected to exhibit very similar frequency characteristics.

The speech signal processing may be performed in the discrete time domain, as depicted in FIG. 1. Alternatively, the speech processing algorithms may be applied in the full Discrete Fourier Transform domain or in the sub-band domain. Processing in the frequency domain may be efficient, since adaptation the frequency domain may show better convergence properties and better tracking capabilities. Suitable algorithms for performing Fast Fourier Transforms and Inverse Fast Fourier Transforms may be selected.

The speech signal processing system 100 or 200 may include a microphone array that includes at least one directional microphone. The microphone may be a noise-canceling, noise filtering, or electret noise-reducing microphone. The system 100 or 200 may be configured for use in a hands-free system for speech signal processing with combined noise reduction and echo compensation as described above. Furthermore, the system 100 or 200 may be adapted for speech signal processing and hands-free use in a vehicle. An improved SNR and echo canceling performance is particularly desirable in the acoustically challenging contents of communication devices in vehicle cabins. If the microphone array 110 is arranged in a frame, it may be mounted in a vehicular cabin, such as in the headliner, pillars, doors, seats, or other structural elements of the vehicle. A vehicle may be any device or structure suitable for transporting persons or things. Automobiles, trucks, airplanes, boats, ships, balloons, helicopters, motorcycles, and other land or sea-borne structures are vehicles.

The method shown in FIG. 3 may be encoded in a signal bearing medium, a computer readable medium such as a memory, programmed within a device such as one or more integrated circuits, or processed by a controller or a computer. If the method is performed by software, the software may reside in a memory resident to or interfaced to the adaptive beamformer 115, the GEC 230, a communication interface, or any other type of non-volatile or volatile memory interfaced or resident to the speech signal processing system 100 or 200. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for speech signal processing with combined noise reduction and echo compensation comprising:
   an adaptive beamforming signal processing unit configured to receive a first speech signal and to derive an adaptively beamformed signal from the first speech signal using an adaptive beamforming filter,
   an adaptive echo compensating unit having an adaptive echo cancellation filter configured to reduce an acoustic echo in the adaptively beamformed signal to derive an echo-reduced signal, and
   an adaptation unit configured to perform a co-optimization of the adaptive beamforming filter and the adaptive echo compensating filter based on a constraint criterion.

2. The system according to claim 1 further comprising:
   a microphone array comprising at least two microphones to detect microphone signals, and
   a loudspeaker that transmits an audio signal comprising a second speech signal,
   where the first speech signal is obtained on the basis of the microphone signal,
   and the adaptive echo compensating unit reduces the acoustic echo in the adaptively beamformed signal on the basis of the loudspeaker signal.

3. The system according to claim 2 where the adaptive beamforming signal processing unit comprises an adaptive beamformer.

4. The system according to claim 2 where the adaptive beamforming signal processing unit comprises:
   a blocking matrix configured to receive the first speech signal and to obtain a noise reference signal,
   an adaptive noise canceling unit configured to receive the noise reference signal and to obtain the adaptive noise signal, and
   a beamformer configured to receive the first speech signal and to obtain the first beamformed signal, and
   a unit configured to subtract the adaptive noise signal obtained by the adaptive noise canceling unit from the first beamformed signal to obtain the adaptively beamformed signal.

5. The system according to claim 4 where the adaptive noise canceling unit and the adaptive echo compensating unit comprise an adaptive filter and where a filter length of the adaptive filter of the adaptive echo compensating unit is substantially equal to or longer than a filter length of the adaptive filter of the adaptive noise canceling unit.

6. The system according to claim 1 where the adaptation unit substantially simultaneously performs the combined co-optimization of the adaptive beamforming unit and the adaptive echo compensating unit by applying a Least Squares optimization criterion.

7. The system according to claim 6 where the constraint of the Least Squares optimization criterion comprises $$(\underline{C}^T(k), 0_{C \times QN_a})^T (w^T(k), a^T(k))^T = c(k)$$

where an upper index T denotes the vector transposition operation, $\underline{C}$ is a conventional constraint matrix known from linearly-constrained minimum variance beamforming, w(k) and a(k) are filters of the adaptive beamforming and the adaptive noise canceling, respectively, Q is a number of the at least one loudspeaker, $N_a$ is a number of filter coefficients of the filters of the adaptive echo canceling unit and c is a constraint vector representing one or more C constraints.

8. The system according to claim 1 further comprising a unit configured to perform a time delay compensation of the microphone signal to obtain the first speech signal.

9. The system according to claim 8 further comprising an adaptive self-calibration unit configured to match a phase and an amplitude of the microphone signal or the time delay compensated microphone signal to obtain the first speech signal.

10. The system according to claim 9, where the adaptive beamforming signal processing unit and the adaptive echo compensating unit or the unit configured to perform a time delay compensation of the microphone signal or the adaptive self-calibration unit are configured to perform a processing in a time domain or in a frequency domain or in a subband frequency domain.

11. The system according to claim 1 where the microphone array comprises at least one directional microphone.

12. A method for speech signal processing with combined noise reduction and echo compensation performed by a signal processing system of a communication device, comprising:
  receiving a first speech signal as an input signal for an adaptive beamforming employing an adaptive beamforming filter,
  receiving an input signal for an adaptive compensating of an acoustic echo employing an adaptive echo compensation filter,
  co-optimizing the adaptive beamforming filter and the adaptive echo compensation filter according to a constraint that provides a relationship between the adaptive beamforming filter and the adaptive echo compensation filter; and
  obtaining an adaptively beamformed signal by the adaptive beamforming and echo compensating the adaptively beamformed signal to obtain an output signal of the speech signal processing.

13. The method according to claim 12 further comprising:
  detecting a microphone signal by a microphone array comprising at least two microphones, and
  obtaining a loudspeaker signal comprising a second speech signal output by at least one loudspeaker, and where the first speech signal is obtained on the basis of the microphone signal, and the input signal for the adaptive compensating of the acoustic echo is the loudspeaker signal.

14. The method according to claim 12 where the adaptive beamforming is performed by an adaptive beamformer.

15. The method according to claim 12 where the adaptive beamforming comprises:
  receiving and processing the first speech signal by a blocking matrix to obtain a noise reference signal,
  processing the noise reference signal by an adaptive noise canceling unit to obtain an adaptive noise signal,
  receiving and processing the first speech signal by a beamformer to obtain a first beamformed signal, and
  subtracting the adaptive noise signal obtained by the adaptive noise canceling unit from the first beamformed signal to obtain an adaptively beamformed signal.

16. The method according to claim 15 where an adaptive filter is used for the adaptive echo compensation and the adaptive noise canceling, and where a filter length of the filter of the adaptive echo compensating unit is equal to or longer than a filter length of the filter of the adaptive noise canceling unit.

17. The method according to claim 12 where the adaptive beamformer filter and adaptive echo compensation filter are co-optimized by applying a Least Squares optimization criterion.

18. The method according to claim 17 where the constraint for the Least Square
  optimization criterion comprises
$$(\underline{C}^T(k), 0_{C \times QN_a})^T (w^T(k), a^T(k))^T = c(k)$$
where a upper index T denotes the vector transposition, $\underline{C}$ is a constraint matrix, w(k) and a(k) are filters of the adaptive beamforming and the adaptive noise canceling, respectively, Q is a number of the at least one loudspeaker, Na is a number of filter coefficients of the filter of the adaptive echo canceling unit and c is a constraint vector representing one or more C constraints.

19. The method according to claim 18 where the microphone signal is compensated for a time delay to obtain the first speech signal.

20. The method according to claim 19 where the microphone signal or the time delay compensated microphone signal is adaptively self-calibrated to obtain the first speech signal.

21. The method according to claim 20 where the adaptive beamforming and the adaptive echo compensating or the time delay compensating or the adaptive self-calibrating are performed in a time domain or in a frequency domain or in a sub-band frequency domain.

22. A computer program product comprising one or more computer readable media having computer-executable instructions for performing the steps of the method according to claim 12.

23. The system according to claim 11 where the system is adapted for use in a vehicle.

24. The method according to claim 18 where the constraint matrix is a Linear Constrained Minimum Variance matrix.

25. The system according to claim 1 where the adaptive beamforming signal
  processing unit comprises a first weight vector used to reduce noise in an output signal,
  where the adaptive echo compensating unit comprises a second weight vector used to reduce echo in an output signal, and
  where the adaptation unit is configured to perform the combined adaptation of the adaptive beamforming unit and the adaptive echo compensating unit by adapting an effective weight vector that is a combination of the first weight vector and the second weight vector.

26. The method according to claim 12 where the adaptive beamforming filter
  comprises a first weight vector used to reduce noise in an output signal, where the adaptive echo compensation filter comprises a second weight vector used to reduce echo in an output signal, and
  where the act of adapting the adaptive beamforming filter and the adaptive echo compensation filter comprises the act of adapting an effective weight vector that is a combination of the first weight vector and the second weight vector.

27. A system for speech signal processing with combined noise reduction and echo compensation, comprising:

an adaptive beamforming filter configured to derive an adaptively beamformed signal from an input signal, an adaptive echo compensation filter configured to reduce an acoustic echo in the adaptively beamformed signal, and an adaptation unit configured to perform a combined adaptation of the adaptive beamforming filter and the adaptive echo compensation filter by adapting an effective weight vector representing combined weights of the adaptive beamforming filter and the adaptive echo compensation filter.

28. The system according to claim 27 where the adaptive beamforming filter comprises a first weight vector used to reduce noise in an output signal, where the adaptive echo compensation filter comprises a second weight vector used to reduce echo in an output signal, and where the effective weight vector, adapted by the adaptation unit, is a combination of the first weight vector and the second weight vector.

* * * * *